United States Patent [19]

Arnold

[11] 4,025,254

[45] May 24, 1977

[54] APPARATUS FOR THE PRODUCTION OF A FLEECE

[75] Inventor: Dieter Arnold, Darmstadt, Germany

[73] Assignee: Carl Schenck AG, Darmstadt, Germany

[22] Filed: June 23, 1975

[21] Appl. No.: 589,381

[30] Foreign Application Priority Data

Oct. 25, 1974 Germany .......................... 2450685

[52] U.S. Cl. ................................ 425/81; 19/156.3; 264/113; 425/83; 156/62.2

[51] Int. Cl.² ............................................ B29J 5/00

[58] Field of Search ................................ 425/81-83; 264/113, 121, 122; 19/156.3, 156.4; 156/62.2

[56] References Cited

UNITED STATES PATENTS

| | | | |
|---|---|---|---|
| 2,546,266 | 3/1951 | Kropp | 425/83 |
| 3,028,287 | 4/1962 | Greten | 425/81 X |
| 3,038,527 | 6/1962 | Greten | 425/81 X |
| 3,098,781 | 7/1963 | Greten | 264/113 X |

*Primary Examiner*—Robert L. Spicer, Jr.

*Attorney, Agent, or Firm*—W. G. Fasse; W. W. Roberts

[57] ABSTRACT

The present apparatus deposits a fleece of wood chips, particles or shavings on a conveyor belt for manufacturing panels. In order to avoid a uniform orientation of all particles in one direction and to assure an orientation of the particles in all directions in substantially uniform distribution, there is provided a particle flow disturbing device for disorienting the chips, particles or shavings as they are directed toward a conveyor belt. The particle flow disturbing device includes a plurality of screens, which intersect at a common axis, which is located slightly above and across the conveyor belt and which extends normal to the direction of movement of the conveyor belt. The wood chips are directed downwardly through the screens by an air current flowing generally in parallel to the conveyor belt to mix the descending wood chips. The common intersection axis of the screens is located upstream of the opposite edges of the screens with respect to the air current. The lowermost screen extends in parallel to the belt and the opening angles between adjacent screens is preferably the same.

10 Claims, 3 Drawing Figures

APPARATUS FOR THE PRODUCTION OF A FLEECE

BACKGROUND OF THE INVENTION

This invention relates to an apparatus for the production of fleece, for example, of glued wood chips or shavings, employed in the production of panels. The invention is particularly directed to a disorienting device, which may be employed for spreading wood chips or shavings received from a charging station onto a conveyor, such as a conveyor belt.

German published Patent Application 1,205,274 discloses an arrangement for the forming of panels from wood chips, wherein the wood chips are directed through a disorientation device for deposition on a conveyor belt. In accordance with arrangements disclosed in this reference, a vibrating screen is provided parallel to and above the conveyor belt. The wood chips to be deposited on the conveyor belt are directed downwardly from a position above the vibrating screen, and various means such as jets of air or rotating wheels are provided to disperse the falling wood chips so that they are spread across the top of the vibrating screen.

The disorientation or spreading devices provided in the above German Patent Publication are relatively expensive to fabricate. Further, in the arrangements of this reference, the various types of disorienting devices employed in the spreading station result in a reduction of the disorientation effect, so that the requisite disorientation of the place of deposit of the shavings, which can include dust, be it in the middle, top or finest top layer, for the provision of a uniform mass distribution is not attained. In the arrangements disclosed in this reference, the disorientation devices may cause the production of secondary currents, which likewise negatively influence the disoriented deposit of shavings and dust particles in the fleece.

OBJECTS OF THE INVENTION

In view of the above, it is the aim of the invention to achieve the following objects, singly or in combination:

to provide a disorientation device for the production of a fleece, which avoids the above disadvantages of the known arrangements by disturbing the particle flow to avoid a uniform distribution of all particles in one direction, stated differently, it is desired to orient the particles so that, in a uniform distribution, there will be particle orientations in all directions rather than only in one direction, whereby to achieve a uniform mass distribution through the finished panels;

to provide a flow disturbing device for the production of a fleece, wherein complete disorientation of the wood chips or shavings deposited on the conveyor belt is effected, and whereby secondary turbulence is not produced and hence cannot interfere with the deposition of the wood chips or shavings; and to provide a flow disturbing device for the production of a fleece, especially for the formation of panels, wherein a plurality of screens are arranged to have a common intersecting axis extending in a direction normal to the direction of movement of the conveyor belt, whereby turbulence in the air currents carrying the wood chips is made uniform.

SUMMARY OF THE INVENTION

Briefly stated, in accordance with the invention, the above objects are achieved by providing a flow disturbing device comprising a plurality of screens intersecting at a common axis. The common axis of the screens is positioned a short distance above a conveyor belt onto which the wood shavings or chips are to be deposited and the common axis extends normal to the direction of movement of the conveyor belt. The wood chips are directed to fall downwardly toward the screens, and a jet of air or a throwing wheel is provided to direct the falling wood chips or shavings onto the uppermost screen. The common axis of the screens is upstream of the other ends of the screens, with respect to the jet of air or the throwing wheel, and the screens extend at different angles from the common axis, with preferably equal opening angles, whereby turbulence created above the uppermost screen is minimized by the screens.

The arrangement in accordance with the invention assures a disoriented deposition of the particle material in a fleece on the conveyor belt to assure a uniform mass distribution, by avoiding localized turbulences which might be caused by the flows emanating from the fleece forming equipment. In other words, the invention assures that any flow turbulences are uniformly distributed above the entire fleece area. The uniform mass distribution is assured according to the invention even if the fleece is to be formed in several layers and it becomes unnecessary to repeatedly readjust the fleece forming equipment. The screens have a mesh width larger than the largest particle size. The screens are positioned so that the particle size distribution resulting from the winnowing effect is not undesirably influenced.

In an especially advantageous arrangement in accordance with the invention, at least three screens are provided, each of these screens having the same mesh size. The screens are arranged to have the same opening angle between adjacent screens. This arrangement provides the particular advantage that the spatial velocity distribution of the flow currents are maintained. In other words, any resulting turbulence is uniformly distributed in the space above the fleece being formed. Thus, the loose particle flow cannot be negatively influenced by secondary turbulences.

In a further arrangement in accordance with the invention, the lowermost screen extends in parallel to the plane of the conveyor band. This arrangement protects the fleece already formed, for example from the air flow current.

BRIEF FIGURE DESCRIPTION

In order that the invention may be more clearly understood, it will now be described, by way of example, with reference to the accompanying drawings, wherein FIG. 1 is a simplified cross sectional view of a spreading station incorporating a flow disturbing device in accordance with one embodiment of the invention;

FIG. 2 is a simplified cross sectional view of a portion of a modification of the arrangement of FIG. 1, illustrating a second embodiment of the invention; and FIG. 3 is a simplified cross sectional view of a portion of a modification of the arrangement of FIG. 1, and illustrating a third embodiment of a flow disturbing device in accordance with the invention.

DETAILED DESCRIPTION OF EXAMPLE EMBODIMENTS

Figure 1:
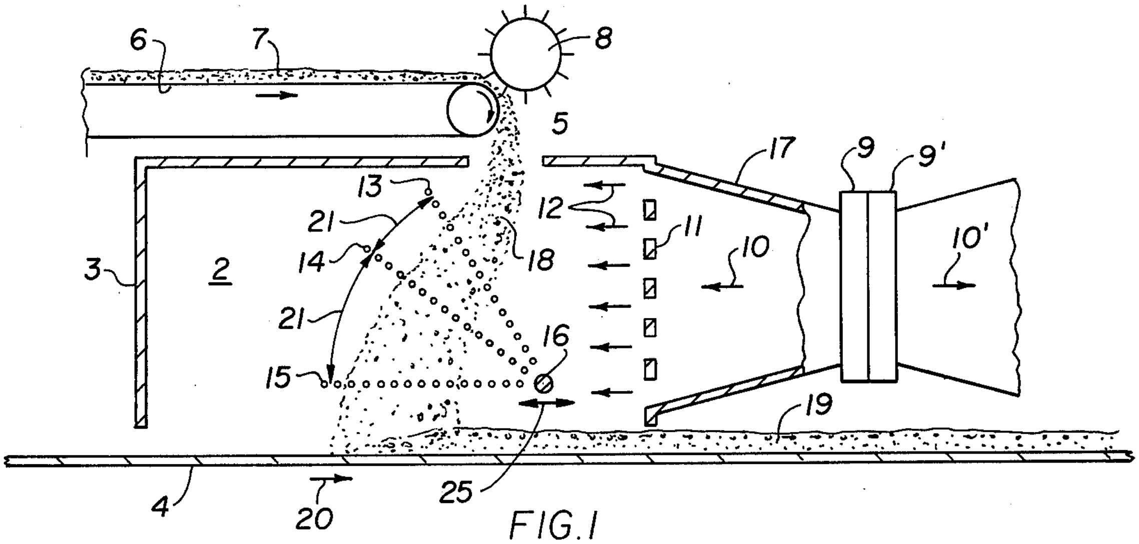

FIG. 1 illustrates in simplified form a cross sectional view of a flow disturbing device in accordance with the invention. In this arrangement, a spreading station 2 has a enclosure 3 with an open bottom positioned a short distance above a conveyor belt 4. The enclosure 3 has an upper opening 5 for receiving chips, shavings or particles, for example of wood or other material suitable for the production of panels to be deposited on the conveyor belt 4 to form a fleece. The term "fleece" means in this context a layer, or several layers on top of each other, of particles of loose but uniform distribution and random orientation.

A further conveyor belt 6 may be located above the enclosure 3 for transporting particles 7 to the opening 5, whereby the particles fall through the opening 5 into the enclosure 3. A spiked wheel 8 may be provided at the opening 5 to facilitate the material flow. It will be understood, that the above manner of introducing wood chips, shavings or the like into the opening 5 is purely illustrative. This portion of the structure of FIG. 1 is disclosed in the above German Patent Publication 1,205,274, and it will be apparent that other conventional means for introducing the chips into the enclosure 3 may alternatively be employed. The particles 7 are coated with glue or adhesive by conventional means not shown, for example, by spray means.

A blower 9 is provided for directing an air current, in the direction of arrow 10, through a register 11. The register 11 may be formed in one side wall of the enclosure 3, or an equivalent arrangement may alternatively be employed. The air passing through the register 11, as indicated by the arrows 12, is blown in a direction parallel to the belt 4 but opposite to the direction of movement of the conveyor belt 4 as indicated by the arrow 20 showing that the belt 4 moves to the right in FIG. 1, for example by spreading the ground layer.

A plurality of screens 13, 14 and 15 are provided within the enclosure 3 above the belt 4. A lower edge of each of the screens 13 to 15 intersects at a common axis or line 16. The axis 16 is located a short distance above the belt 4 and extends transversely to the direction of movement of the belt 4. The axis 16 is located upstream of the upper edge of each of the screens 13, 14 and 15, with respect to the direction 12 of air flow in the enclosure. The opening 5 and the screens 13 to 15 extend throughout the width of the enclosure 3, i. e. in the direction normal to the plane of the drawing. The air from blower 9 may be directed to the register 11 through a diffuser 17. The air from the register 11, which is directed into the particle flow indicated by dashed lines 18 causes a turbulence as well as a winnowing effect, which is uniformly distributed through the entire volume of the particle flow, whereby the smaller and finest particles will be blown rather than thrown in such a manner that these particles first form a bottom layer on the belt 4 which is then covered by a layer of larger or coarser particles. This is an advantageous desirable effect of the invention because it facilitates the sanding of the finished product. Preferably, all the screens located as taught herein have the same mesh size larger than the size of the largest particles. These screens assure a uniform distribution of the turbulence in the space through which the particles travel whereby particle knots, that is particle density accumulations, are resolved. On the other hand, particle distributions having the desired density will freely pass through the screens due to said mesh size. Thus, the invention has the advantage that any particles knots, which might be formed as a result of uncontrolled turbulence in the region between the register 11 and the uppermost screen 13, are resolved so that a uniform particle density in the fleece is assured along with a random particle orientation.

The conveyor belt 4 in the above example of the invention is driven to continuously move to the right, in the direction of the arrow 20. This travel direction of the conveyor belt facilitates the above mentioned effect according to which the finest shavings or dust particles are deposited on the conveyor at the bottom of the layer of the fleece 19, and larger shavings are deposited over the smaller shavings. The spreading station in accordance with the invention may also be employed to form a fleece having three layers, for example, in which the upper and lower cover layers comprise the material of fine particle sizes and the central layer is formed of the larger, coarser particle sizes. Further, fine particle sizes may also be placed in the central layer if these finer particles are provided with an overdose of glue of if these finer particles are heavier which may be the case where the particles are produced by grinding wheels which are used up in the process. The particles of the grinding wheel material become part of the fleece material and it is desirable to avoid that these grinding wheel particles appear on the surface of the panels because the grinding wheel particles would interfere with the sanding operation. The blow deposit of particles through the screens avoids such an undesirable side effect by assuring the collection of the fine grinding wheel particles in the central layer of the fleece.

In order to produce a three layer fleece as described above a second depositing station with a second blower 9′ blowing in the direction of the arrow 10′ is arranged in mirror symmetrical fashion relative to the left hand portion of FIG. 1. Since the right hand portion of FIG. 1 comprises the same elements as the shown left hand portion, only the blower 9′ is shown while the remainder is broken away for simplicity's sake. The blower 9′ with its respective register, housing and screens assures that a third layer with fine particle sizes covers the central layer of coarse particle sizes.

As illustrated in FIG. 1, the screens 13, 14 and 15 have the same opening angle 21 with respect to one another. The screens also have the same mesh sizes. In one example of the invention the mesh width may be four times the size of the largest particle expected to be deposited on the belt 4. Instead of employing the same opening angles, however, the screens 13, 14 and 15 may be fanned-out with different opening angles, the screen 15 preferably being positioned parallel to the conveyor surface in order to avoid the extension of uncontrolled turbulence through the screen 15, whereby any negative influences of such turbulence on the deposited fleece are avoided.

Figure 2:
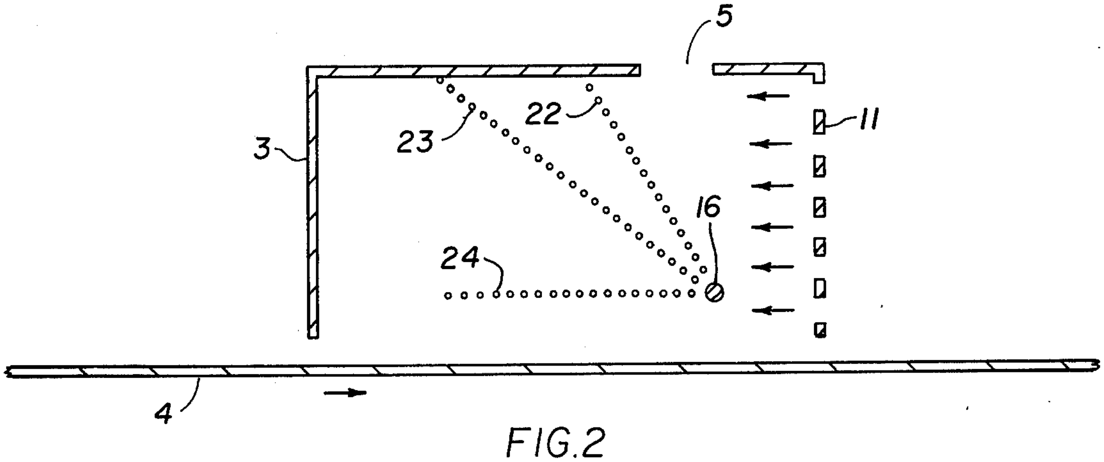

For most purposes it is sufficient that the three screens 13, 14 and 15 have the same length, whereby the upper edges thereof away from the lower edges coinciding in the common axis 16, are at different distances from the top of the enclosure 3. In some cases, however, for example when a majority of the chips to be deposited have large surfaces, it is preferred in accordance with the invention to extend the upper screens 22 and 23 to the top of the enclosure 3, as illustrated in FIG. 2. The lowermost screen 24 in this case may be parallel to the plane of the conveyor belt 4. The inclination of the screens 22 and 23 holds back the larger surface shavings, so that they are not deposited on the fleece in positions to be visible at the surface thereof.

While it is preferred that three screens be employed, as illustrated in FIGS. 1 and 2, in order to make the turbulence uniform, the effect can be somewhat improved by increasing the number of screens in the fan to a certain degree. If desired, the common axis 16 of the screen surface can be moved or displaced in a direction parallel to the surface of the conveyor, as indicated by the arrows 25, for adjustment of the device. The common axis 16 is arranged so far under the lower current jet from the register that no undesired turbulence can be produced by interaction with the air currents at the common axis.

Figure 3:
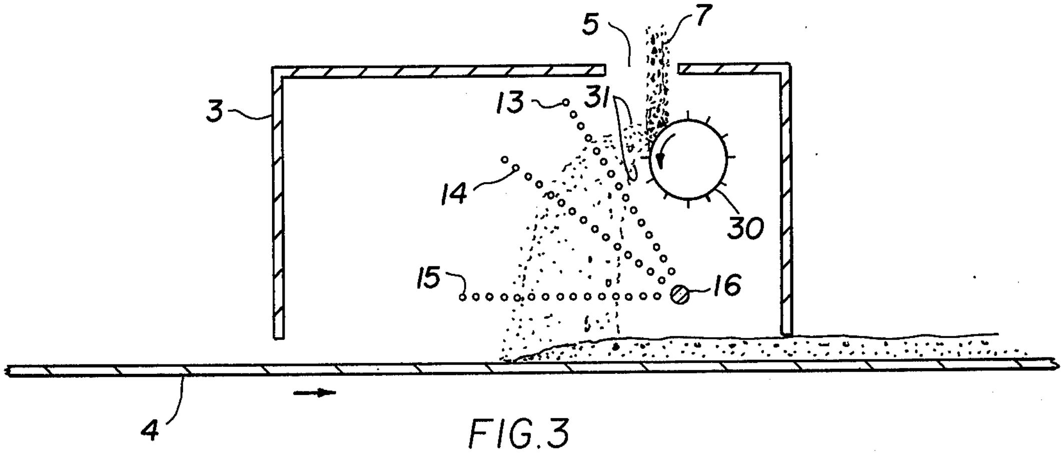

In a further embodiment of the invention, as illustrated in FIG. 3, the blower 9 and the register 11 may be replaced by a throwing drum 30 positioned within the enclosure 3. A throwing drum of this type of disclosed, for example, in the above German Patent Publication 1,205,274. In the arrangement of FIG. 3, the screens 13, 14 and 15 are also provided and act in the same manner to make turbulent motion of the wood shavings uniform.

Thus, as illustrated in FIG. 3, the wood chips 7 falling through the opening 5 are directed to the surface of the rotating drum 30 and are thereby deflected from the drum 30 through the screens 13 to 15 onto the belt 4, in a locus generally indicated by the dashed lines 31. In this instance, the axis 16 may be adjusted, as indicated by the arrows 25 in FIG. 1 to provide a desirable resolution effect of the wood chips or shavings, However, the belt 4 moves to the left.

Although the invention has been described with reference to specific embodiments, it is to be understood, that it is intended to cover all modifications and equivalents within the scope of the appended claims.

What is claimed is:

1. In an apparatus for producing a fleece, wherein a spreading station arranged above a conveyor belt receives fleece forming material from a charging station to deposit said material on said conveyor belt and wherein said spreading station comprises material flow disturbing means, the improvement wherein said material flow disturbing means comprise a plurality of screens intersecting at a common axis spaced above and across said conveyor belt, said common axis extending normal to the direction of movement of said conveyor belt, said apparatus further comprising means for directing material received in said spreading station onto said screens so that the material may pass through said screens onto said conveyor belt.

2. The apparatus of claim 1, wherein said plurality of screens comprises at least three screens having the same mesh size, said screens extending from said common axis at such angles that the opening angle between adjacent screens is the same for all screens.

3. The apparatus of claim 2, wherein the lowermost of said screens is parallel to said conveyor belt.

4. The apparatus of claim 1, wherein said means for directing comprises means for directing a flow of air to said material above said screens, whereby said material is turbulently moved above and through said screens.

5. The apparatus of claim 1, wherein said means for directing comprises a throwing wheel positioned to receive material and to throw said material onto the uppermost of said screens.

6. The apparatus of claim 1, wherein said screens have the same length.

7. The apparatus of claim 1, wherein the mesh sizes of said screens are equal and substantially greater than the largest particle of material to be deposited on said belt.

8. The apparatus of claim 1, wherein said spreading station comprises an enclosure having an opening in its upper surface for receiving material to be spread on said conveyor, said material flow disturbing means comprising at least three screens whereby the upper two of said screens extends substantially from said common axis to said enclosure.

9. The apparatus of claim 1, wherein said material directing means comprise an air blower blowing air in a flow direction opposite to the direction of movement of said conveyor belt, for example by spreading the ground layer, said plurality of screens comprising at least three screens each having an upper edge and a lower edge, at least two screens being inclined in said flow direction of said blowing air so that said common axis in which said lower edge of each screen extends, is located upstream also relative to said upper edge of the screen having the least inclination.

10. The apparatus of claim 9, comprising a further air blower and screen set arranged in mirror symmetrical fashion relative to said first mentioned air blower and plurality of screens whereby a fleece is formed having a layer of coarser particles sandwiched between two outer layers of finer particles.

* * * * *